Nov. 18, 1924.

P. BOOR

BEET HARVESTER

Filed Oct. 5, 1923

Paul Boor
Inventor,

By C.A. Snow & Co.
Attorneys

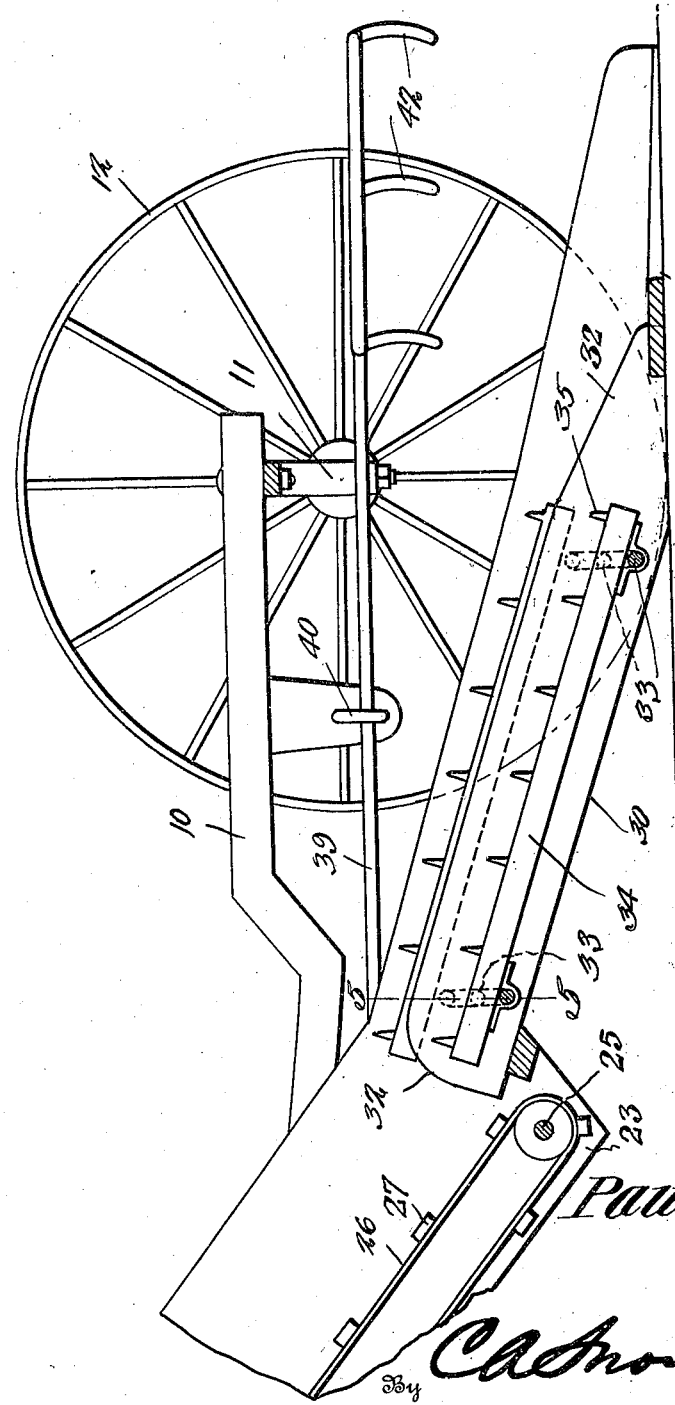

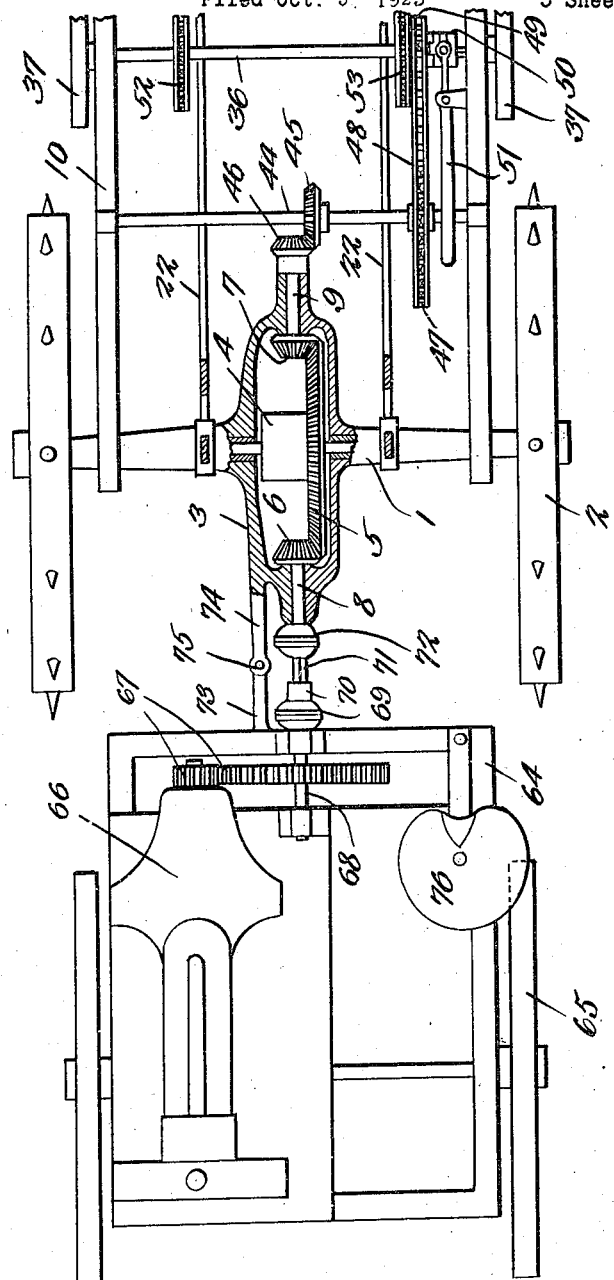

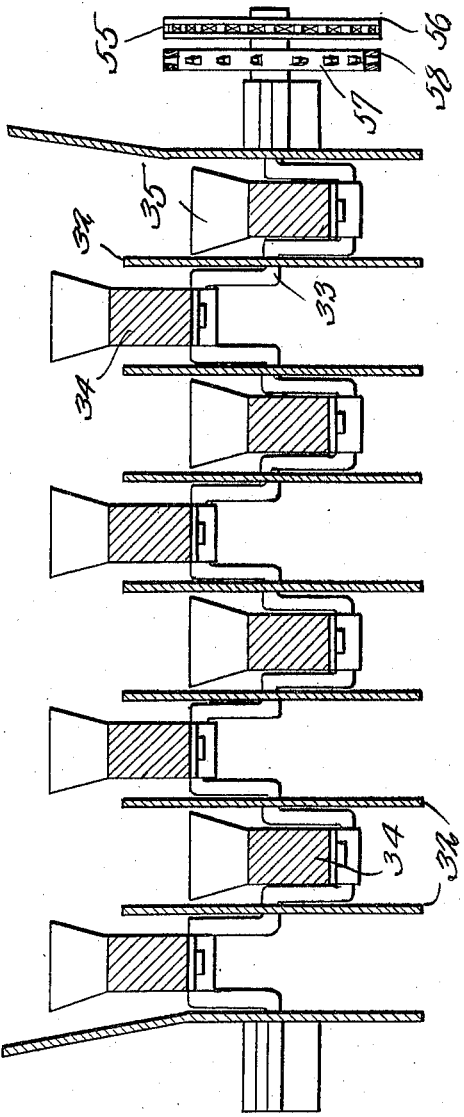
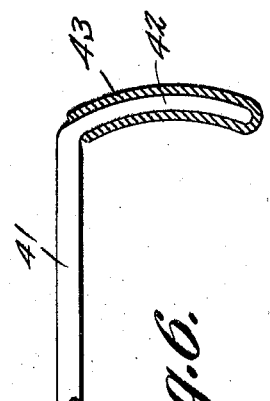

Patented Nov. 18, 1924.

1,516,037

UNITED STATES PATENT OFFICE.

PAUL BOOR, OF FORSYTH, MONTANA.

BEET HARVESTER.

Application filed October 5, 1923. Serial No. 666,790.

*To all whom it may concern:*

Be it known that I, PAUL BOOR, a citizen of the United States, residing at Forsyth, in the county of Rosebud and State of Montana, have invented a new and useful Beet Harvester, of which the following is a specification.

This invention relates to machines for harvesting sugar beets and the like, one of the objects of the invention being to provide improved means whereby the beets, after being dug, can be directed by mechanical means onto the structure.

Another object is to provide a machine of novel construction for agitating and sifting the beets so as to clean them and direct them onto a suitable elevator provided therefor.

A further object is to provide the machine with a trailer carrying an engine utilized for the purpose of operating the parts of the beet harvester.

A further object is to provide a machine of this character which is simple, durable and compact, and will operate efficiently for gathering and cleaning the beets and delivering them from the machine.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings:—

Fig. 3 is an enlarged vertical longitudinal section through the beet gathering portion of the machine.

Fig. 4 is a plan, partly in section, of the rear portion of the machine.

Fig. 5 is an enlarged section on line 5—5 Fig. 3.

Fig. 6 is an enlarged elevation partly in section of one of the gathering fingers.

Figure 1:
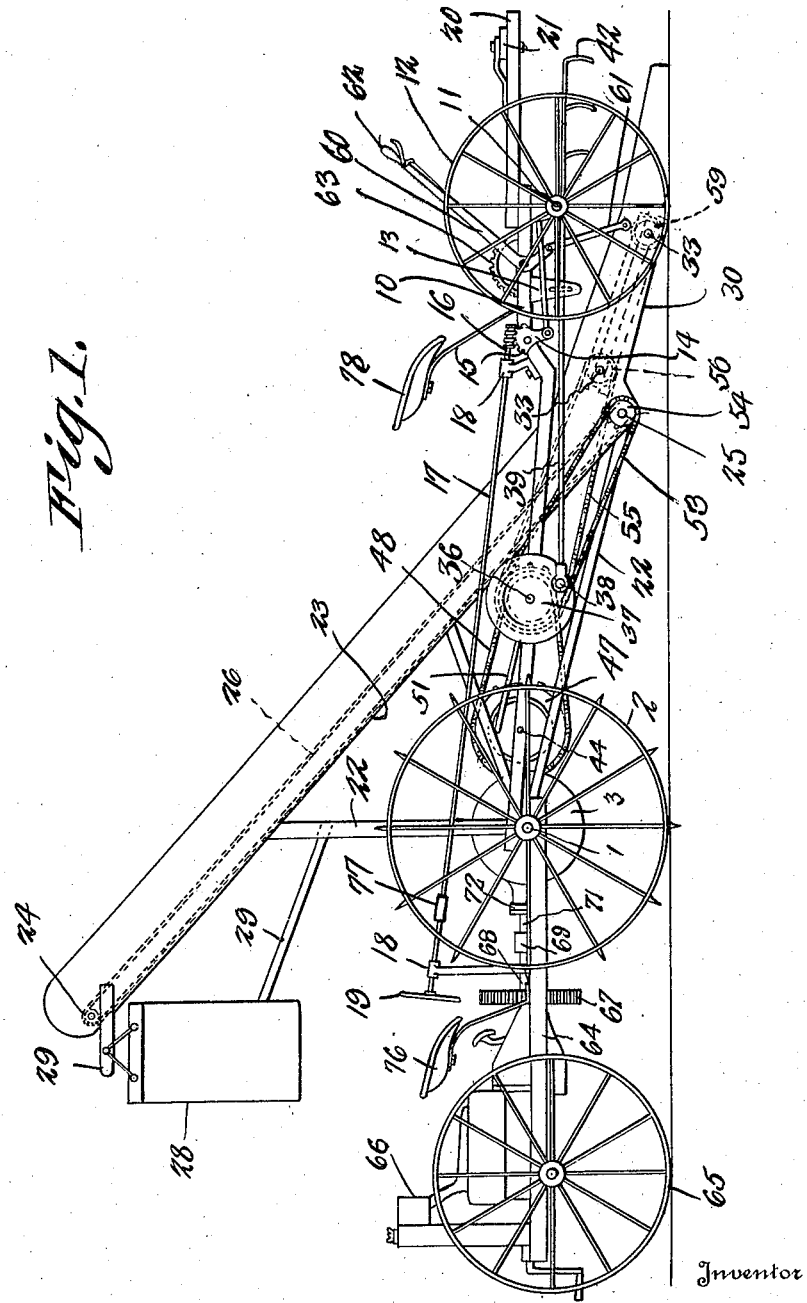
Figure 1 is a side elevation of the complete machine.

Referring to the figures by characters of reference 1 designates the rear axle of the machine supported by wheels 2 and having a housing 3 for a transmission including the usual differential indicated generally at 4, a gear 5, and oppositely disposed gears 6 and 7 meshing with the gear 5. A shaft 8 is journaled in the housing 3 and is seated upon gear 6 while another shaft 9 is journaled in said housing and is extended from gear 7.

The main frame 10 of the machine is mounted at one end on the axle 1 while its other end is supported by the front axle 11 supported by wheels 12.

Any suitable means may be provided for guiding the machine. For example, the wheels 12 can be mounted to swing relative to the axle 11 in the same manner as the ordinary automobile wheels and these wheels can be shifted by means of a rod 13 extending from a lever 14 having a segmental gear 15. A worm 16 meshes with this gear and is provided at one end of a shaft 17 journaled in suitable bearings 18. A hand wheel 19 is connected to the shaft and is supported close to the rear end of the machine. Thus by rotating shaft 17 the wheels 12 can be turned to the right or to the left in the same manner as the ordinary front wheels of a motor vehicle.

For the purpose of drawing the machine over a field, a draft tongue may be used, a portion thereof being illustrated at 20. A whiffle tree 21 can be mounted on this tongue.

A supplemental frame 22 is pivotally mounted at one end upon the axle 1 and includes a forwardly extending portion and an upwardly extending portion, these portions being fixedly connected to the inclined frame 23 of the elevator. A transverse shaft 24 is journaled in the upper portion of the frame 23 and another transverse shaft 25 is journaled in the lower portion of the frame, the two shafts supporting an endless elevator 26 provided with parallel cleats 27 extending transversely thereof.

A downwardly and laterally inclined delivery chute 28 is supported below the upper end of the elevator so that the beets, when delivered from the elevator, will fall onto and be directed laterally by this chute. Any suitable means may be employed for supporting and bracing the chute, the means being indicated at 29.

The frame 23 has a forwardly extending portion 30 at its lower end secured to the forward end of which is a collecting apron or plate 31. That portion of the frame between the plate 31 and the elevator 26 is divided by longitudinal partitions 32 into separate channels extending longitudinally of the structure. These partitions also cooperate to form a grate for supporting the beets, the upper edges of the partitions being inclined downwardly close to the upper surface of the plate 31 so that beets can slide readily from said plate onto the grate.
Transversely arranged crank shafts 33 are journaled in the partitions 32 and also in the sides of the extensions 30, one crank of each shaft being located in each of the channels between the partitions. These cranks support lifting bars 34 having upstanding feet 35. Two series of cranks are provided on each shaft 33, the cranks of one series being extended oppositely to the cranks of the other series. Thus when one set of bars 34 are in their lowermost position, the remaining bars are in their uppermost position with their teeth projecting above the partitions 32, as shown in Fig. 3.
A transverse shaft 36 is journaled on the frame 10 and extends under the elevator, this shaft being provided at each end with a disk 37 carrying a wrist pin 38. Rods 39 are pivotally mounted on the wrist pins and extend forwardly under the front axle 11 and through guides 40 depending from the frame 10 and loosely supporting the rods. Each rod has its forward end forked as at 41 and from each arm of each fork project downwardly extending fingers 42 overhanging the plate 31. As shown in Fig. 6, each finger may be provided with a covering sleeve 43 of rubber which acts as a protecting material to prevent the fingers from bruising the beets with which they come in contact.

A shaft 44 is journaled on the frame 10 and has a gear 45 receiving motion through a gear 46 from the shaft 9. Secured to the shaft 44 is a sprocket 47 from which motion is transmitted through a chain 48 to a sprocket 49 loosely mounted on the shaft 36. A clutch member 50 is feathered on shaft 36 and is adapted to be operated by a lever 51. This clutch member is designed, when in one position, to couple sprocket 49 to shaft 36 and, when in another position, to release said sprocket so that it will not drive the shaft 36.
Secured to the shaft 36 so to rotate therewith are sprockets 52. One of these sprockets transmits motion through a chain 53 to a sprocket 54 secured to the shaft 35 of the elevator. The other sprocket 52 transmits motion through a chain 55 to a sprocket 56 on the rear or upper shaft 33. Another sprocket 57 is secured to the upper or rear shaft 33 and is designed to transmit motion through a chain 58 to a sprocket 59 secured to the lower or front shaft 33. Thus simultaneous rotation of the two shafts 33 is insured and the lifting bars 34 will be maintained parallel at all times during the operation of the machine.

For the purpose of adjusting the front end of the mechanism relative to the surface of the ground, a bell crank 60 is journaled on the front portion of the frame 10, one arm of the bell crank being connected by a link 61 to the extension 30 of the elevator frame while the other arm of the bell crank constitutes a hand lever 62. Any suitable means such as a toothed segment 63 cooperating with a dog or the like carried by the lever 62, can be employed for holding the bell crank in any position to which it may be adjusted. Obviously by shifting the bell crank the front portion of the apparatus can be raised or lowered to bring the plate 31 to a desired position relative to the surface over which it is moving.

Figure 2:
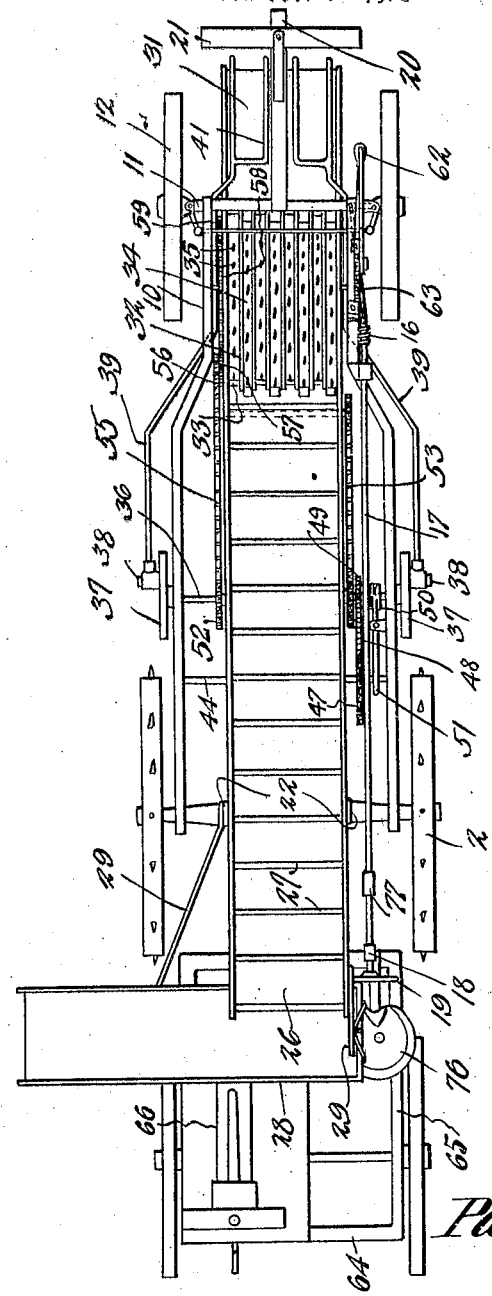
Fig. 2 is a plan view thereof.

For the purpose of actuating the mechanism constituting the present invention there is provided a trailer in the form of a frame 64 having supporting wheels 65. On this trailer is mounted an engine 66 adapted to transmit motion through gears 67 to a shaft 68 journaled on the trailer. The front of this shaft is connected by a universal joint 69 to a tubular shaft extension 70 and this extension 70 is slidably engaged by an angular shaft 71 connected by a universal joint 72 to the shaft 8. Arms 73 and 74 are extended from the frame 64 and the housing 3 respectively and are hingedly connected a shown at 75. Thus the trailer can swing laterally relative to the axle 1 about the connection 75 and motion can be transmitted from shaft 68 to shaft 8 through the telescopic and universal connections therebetween. A seat 76 is provided for the driver on the frame of the trailer and the hand wheel 19 of the steering mechanism is adapted to be supported close to this seat as shown in Figs. 1 and 2.

To allow for the movement of the trailer relative to the main structure, a universal and telescopic connection indicated generally at 77 is preferably provided in the shaft 17.

It will be understood that when the machine is drawn forward it can be steered by means of the apparatus provided for that purpose and motion will be transmitted from the engine 66 to the sprocket 49. When it is desired to harvest and deliver beets the sprocket 49 is coupled to the shaft 36 so that motion will then be transmitted from said shaft to the elevator and to the shaft 33 as will be obvious. At the same time the disk 37 will be rotated and cause the rods 39 to reciprocate and oscillate relative to their guides 40. The plate 31 will dig under the loosened or plowed beets and the reciprocation and oscillation of rods 39 will result in the fingers 42 moving downwardly and forwardly so as to engage the beets and draw them rearwardly along the plate 31 and thence onto the grate formed by the partitions 32. Here the beets will be engaged by teeth 35 on the ascending and rearwardly moving bars 34 with the result that the beets will be lifted off the grate and moved upwardly and rearwardly and again deposited on the grate. This intermittent shifting of the beets will result in the separation of dirt from them and the dirt will sift downwardly though the grate while the beets will ultimately be delivered to the lower portion of the elevator 26. This elevator will conduct them to the upper end of the frame 23 where the beets will be delivered to chute 28 and discharged laterally from the chute.

It will be noted that a space 78 is provided upon the front portion of the frame 10 for the driver. Obviously the construction can be modified readily so that the engine 66 can be utilized for propelling the machine as well as driving the mechanism carried thereby.

What is claimed is:—

1. The combination with a wheel supported frame including an elevator, of a forwardly and downwardly inclined grate, a collecting plate in front of the grate, liftings bars mounted for rotation within the grate for elevating and rearwardly shifting articles deposited on the grate, gathering fingers overhanging the plate, and means for simultaneously actuating the elevator and lifting bars and oscillating and reciprocating the gathering fingers.

2. The combination with a wheel supported structure including an endless elevator, of a grate in front of the elevator for directing articles thereonto, a gathering plate in advance of the grate, lifting bars movably mounted within the grate for lifting articles from the grate and directing them rearwardly onto the elevator, gathering fingers overhanging the plate, means for simultaneously actuating the lifting bars and the elevator and for oscillating and reciprocating the gathering fingers, and means for adjusting the plate and the grate upwardly and downwardly relative to the surface of the ground.

3. The combination with a wheel supported structure and a trailer coupled thereto, of an elevator on said structure, a grate in front of the elevator, lifting bars movably mounted within the grate, a gathering plate in front of the grate, a forked rod mounted for oscillation and reciprocation above the plate, gathering fingers extending from the fork, a motor upon the trailer, and means operated by the motor for simultaneously actuating the lifting bars and elevator and reciprocating and oscillating the gathering fingers.

4. The combination with a wheel supported structure, of a trailer hingedly connected thereto, a motor carried by the trailer, power transmitting mechanism upon the wheel supported structure, a telescopic and universal joint connection between the power transmitting mechanism and the motor, an elevator upon said structure, a grate in front of the elevator, a plate in front of the grate, lifting bars mounted for rotation between the bars of the grate, gathering fingers movably supported above the plate, and means actuated by the power transmitting mechanism for simultaneously operating the lifting bars and the elevator and for oscillating and reciprocating the gathering fingers.

In testimony that I claim the foregoing as my own, I have hereto affixed my signature in the presence of two witnesses.

PAUL BOOR.

Witnesses:
G. W. HANSON,
E. A. CORNWELL.